US009383576B2

United States Patent
Andreasen

(10) Patent No.: US 9,383,576 B2
(45) Date of Patent: Jul. 5, 2016

(54) APPARATUS AND METHOD FOR A FLEXIBLE ADAPTIVE TELESCOPE MIRROR

(71) Applicant: Rachel Andreasen, Rosemount, MN (US)

(72) Inventor: Rachel Andreasen, Rosemount, MN (US)

(*) Notice: Subject to any disclaimer, the term of this patent is extended or adjusted under 35 U.S.C. 154(b) by 233 days.

(21) Appl. No.: 13/944,856

(22) Filed: Jul. 17, 2013

(65) Prior Publication Data

US 2014/0368939 A1    Dec. 18, 2014

Related U.S. Application Data

(60) Provisional application No. 61/672,289, filed on Jul. 17, 2012.

(51) Int. Cl.
    *G02B 26/08*      (2006.01)
    *G02B 23/06*      (2006.01)
    *G01B 11/25*      (2006.01)

(52) U.S. Cl.
    CPC ........ *G02B 26/0825* (2013.01); *G01B 11/2513* (2013.01); *G02B 23/06* (2013.01); *G02B 26/0841* (2013.01)

(58) Field of Classification Search
    CPC ........................ G02B 26/0825; G02B 26/0841
    USPC ................................................. 359/846, 847
    See application file for complete search history.

(56) References Cited

U.S. PATENT DOCUMENTS

| | | | |
|---|---|---|---|
| 4,927,241 A * | 5/1990 | Kuijk | 349/193 |
| 5,907,436 A | 5/1999 | Perry et al. | |
| 6,108,121 A * | 8/2000 | Mansell | G02B 26/0841 359/224.1 |
| 6,679,611 B2 | 1/2004 | Howard | |
| 6,754,006 B2 | 6/2004 | Barton et al. | |
| 2001/0040743 A1 * | 11/2001 | Graves et al. | 359/849 |
| 2003/0231413 A1 * | 12/2003 | Howard | 359/846 |
| 2006/0181712 A1 * | 8/2006 | Degertkin | G01B 11/02 356/505 |
| 2008/0204661 A1 * | 8/2008 | Koga et al. | 351/221 |
| 2012/0224243 A1 | 9/2012 | Friedenauer et al. | |
| 2012/0261551 A1 * | 10/2012 | Rogers | 250/208.1 |

FOREIGN PATENT DOCUMENTS

EP      EP 0252034 A2      1/1988

OTHER PUBLICATIONS

Holenstein, Bruce D., et al., "Experiments with Pneumatically-Formed Metalized Polyester Mirrors", "Genet, Johnson, & Wallen, Eds.: 'The Alt-Az Initiative: Telescope, Mirror, & Instrument Developments,' Chapter 24", 2010, Publisher: Collins Foundation Press.
Waddell, P., "Development of a stretchable concave imaging membrane mirror of variable focus", "Jul. 15, 2013 downloaded from: http://www.dtic.mil/dtic/tr/fulltext/u2/a197228.pdf", May 1988.

* cited by examiner

*Primary Examiner* — Zachary Wilkes
*Assistant Examiner* — Mitchell Oestreich
(74) *Attorney, Agent, or Firm* — Charles A. Lemaire; Lemaire Patent Law Firm, P.L.L.C.

(57) ABSTRACT

This invention is for a flexible telescope mirror. A mirrored film is stretched across a frame, and deformed into a rough parabola using a partial vacuum. The film is then deformed into a more perfect parabola using electric fields. In some embodiments, a feedback system based on a laser projector and a camera is used to fine tune the resulting parabola for optical performance. The invention allows the creation of large telescope mirrors for a substantially lower price than conventional ground glass mirrors, and allows the creation of substantially lighter mirrors, suitable for space-based applications.

10 Claims, 10 Drawing Sheets

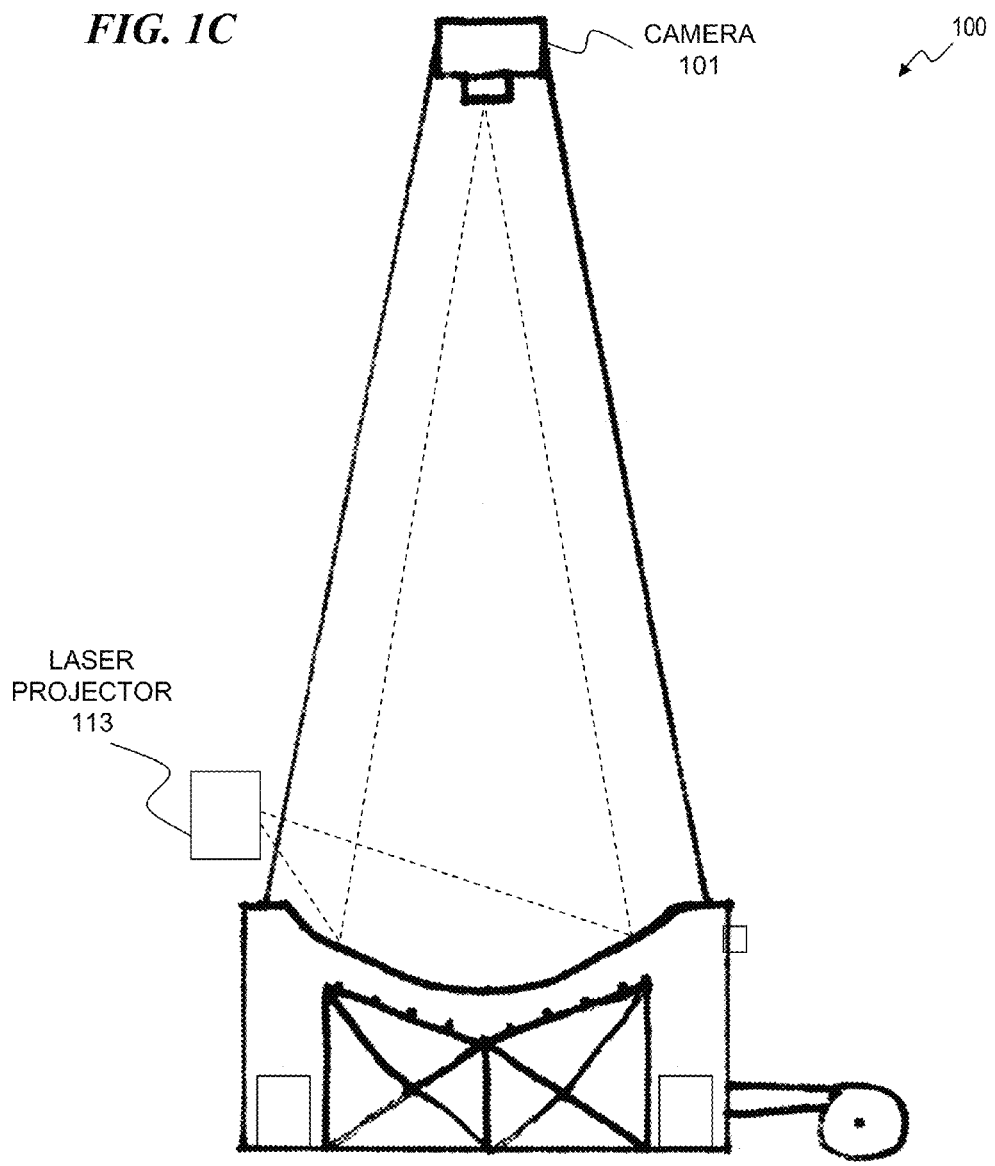

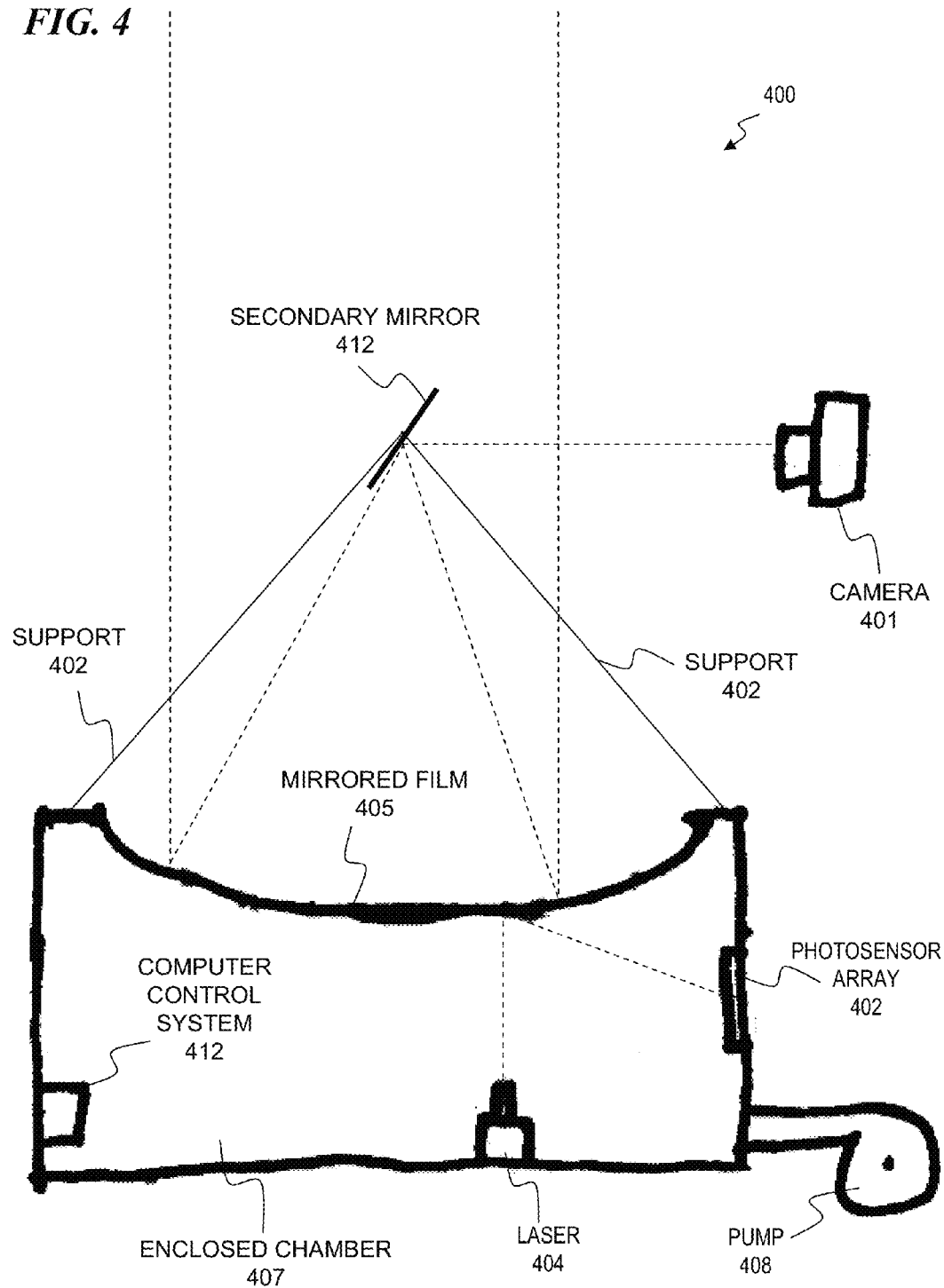

APPARATUS AND METHOD FOR A FLEXIBLE ADAPTIVE TELESCOPE MIRROR

CROSS-REFERENCE TO RELATED APPLICATION

This application claims priority benefit, under 35 U.S.C. §119(e), of U.S. Provisional Patent Application 61/672,289, filed Jul. 17, 2012 by Rachel Andreasen and titled "Flexible telescope mirror," which is incorporated herein by reference in its entirety.

FIELD OF THE INVENTION

This invention relates to the field of telescopes, and more specifically to high-quality adaptive and adjustable telescopes which may be built relatively inexpensively, for use by amateur astronomers.

BACKGROUND OF THE INVENTION

While traditional ground-glass telescope mirrors offer very-high-quality imaging, they are very expensive and difficult to make. This invention promises to reduce the price of a one-meter primary mirror, currently costing on the order of $100,000, to under $1,000. It can also reduce or eliminate optical aberrations due to creep, flex, or thermal expansion and contraction.

U.S. Pat. No. 6,679,611, which issued on 20 Jan. 2004 to Robert J. Howard and is titled "Adaptive, Aluminized Mylar Mirror," is incorporated herein by reference. Howard describes an infrared beam directed to the surface of a Mylar mirror, and the mirror reflects that beam. The reflected beam is detected, and data gleaned from the reflected beam is used to determine whether the optics of the mirror must be adjusted. The optics of the mirror are adjusted by varying voltage applied to electrostatic actuators on the frame of the mirror, or varying the pressure in chambers formed by the mirror frame and mirror surface.

U.S. Pat. No. 6,754,006 entitled "Hybrid metallic-dielectric grating" issued Jun. 22, 2004 to Barton et al. and is incorporated herein by reference. This patent describes a diffraction grating having a metallic base layer and layers of dielectric materials of varying refractive index, where a bottom interface of the layers is adherent to the metallic base layer. The dielectric layers are periodically spaced on top of the metallic base layer, leaving the metallic base layer exposed in regions. This grating allows for the polarization-insensitive reflective properties of the base metallic layer to operate in conjunction with the polarization sensitive diffraction properties of the multilayer grating structure to provide near 100% diffraction efficiency over a reasonable wavelength bandwidth, independent of the polarization of the incident beam.

U.S. Pat. No. 5,907,436 entitled "Multilayer dielectric diffraction gratings" issued May 25, 1999 to Perry et al., and is incorporated herein by reference. This patent describes the design and fabrication of dielectric grating structures with high diffraction efficiency. The gratings have a multilayer structure of alternating index dielectric materials, with a grating structure on top of the multilayer, and obtain a diffraction grating of adjustable efficiency, and variable optical bandwidth.

Other background to the present invention is described in a book chapter titled "Experiments with Pneumatically-Formed Metalized Polyester Mirrors," by Bruce D. Holenstein, Richard J. Mitchell, Dylan R. Holenstein, Kevin A. Iott and Robert H. Koch, that appears in Genet, Johnson, & Wallen, Eds. (2010), "The Alt-Az Initiative: Telescope, Mirror, & Instrument Developments."

The concept of a flexible mirror is not new. A 1988 technical-report publication by Waddell, titled "Development of a stretchable concave imaging membrane mirror of variable focus," describes a membrane mirror which is shaped by differences in air pressure. European Patent Application Publication EP 0252034 A2 of Ugo, published 7 Jan. 1988 and titled "Electronic corrector of curvature defects on image, for telescopes provided with large diameter light weight catoptric parts, to be used in orbit as well," is incorporated by reference. Ugo describes projecting a laser onto a telescope-mirror surface to obtain actual curvature characteristics of a telescope mirror, comparing the actual telescope-mirror surface characteristics against an ideal model, and calculating discrepancies between the two, and subsequently using the data for correcting telescope images.

What is needed, and what the present invention provides, is a refined control system for a flexible mirror to achieve greater optical acuity.

SUMMARY OF THE INVENTION

The present invention provides a flexible telescope mirror. In some embodiments, a thin flexible metalized plastic film is stretched over a frame, then deformed into a parabola through the application of air pressure and electric fields. This allows for the creation of a primary telescope mirror significantly cheaper than traditional ground-glass mirrors. With projected costs well under $1,000 for a one-meter-diameter telescope, even elementary schools could afford to perform astronomical observations at near-professional levels.

In some embodiments, a peristaltic pump is used to create the fluid pressure differential which deforms the thin flexible metalized plastic film. This allows for precise and continuous control of the pressure.

In some embodiments, for the electrostatic tuning of the mirror, electrodes are first constructed as a set of conventional printed circuit boards. These circuit boards are then connected together to form a three-dimensional (3-D) geometric dome, roughly conforming to the parabolic mirror. This design does not require precision placement of electrodes, and reduces the amount of charge required for precise tuning of the mirror.

In some embodiments, to calibrate the mirror, a laser projects a grid onto the mirror, which is captured by the same camera used to view the magnified images of the subject. This eliminates the need for a separate, complex camera system to test for aberrations.

This invention differs from the prior art in four main ways:
First, some embodiments of this invention use a precision peristaltic pump, or other pump, to create the pressure differential across the plastic film, instead of solenoid valves.
Second, some embodiments of this invention use a fixed laser-projection pattern for calibration instead of a scanning laser.
Third, some embodiments of this invention use a conventional digital camera for both calibration and telescope viewing, instead of a specialized dedicated calibration camera.
Fourth, some embodiments of this invention use a 3-D geometric circuit board for the electrode array.

In some embodiments, the present invention provides an apparatus which includes: a frame; a mirrored, electrically conductive film having a first face which is highly reflective and a second face facing the frame, wherein the mirrored, electrically conductive film is stretched across the frame in a manner which creates an enclosed chamber against the second face of the mirrored, electrically conductive film; a pump operably coupled to the enclosed chamber facing the second face of the mirrored, electrically conductive film; an electrode array located in the enclosed chamber facing the second face of the mirrored film; a camera facing the first face of the mirrored, electrically conductive film; and a computer-control system operably coupled to receive signals from the camera, and configured to send control signals to the pump and to the electrode array, in order to reshape the mirrored, electrically conductive film into an optically suitable shape.

In some embodiments, the present invention provides: providing a frame; providing a mirrored, electrically conductive film having a first face which is highly reflective and a second face facing the frame; stretching the mirrored, electrically conductive film across the frame in a manner which creates an enclosed chamber against the second face of the mirrored, electrically conductive film; pumping a fluid from the enclosed chamber facing the second face of the mirrored, electrically conductive film; applying an electrostatic force to one or more sub-areas of the second face of the mirrored film; acquiring an image of the first face of the mirrored, electrically conductive film; and calculating correction factors based on the acquired image; and sending control signals to control the pumping and to control the applying of electrostatic force to the one or more sub-areas of the second face of the mirrored film, in order to reshape the mirrored, electrically conductive film into an optically suitable shape.

In some embodiments, the present invention provides: a frame; a mirrored, electrically conductive film having a first face which is highly reflective and a second face facing the frame; means for stretching the mirrored, electrically conductive film across the frame in a manner which creates an enclosed chamber against the second face of the mirrored, electrically conductive film; means for pumping a fluid from the enclosed chamber facing the second face of the mirrored, electrically conductive film; means for applying an electrostatic force to one or more sub-areas of the second face of the mirrored film; means for acquiring an image of the first face of the mirrored, electrically conductive film; and means for calculating correction factors based on the acquired image; and means for sending control signals to control the pumping and to control the applying of electrostatic force to the one or more sub-areas of the second face of the mirrored film, in order to reshape the mirrored, electrically conductive film into an optically suitable shape.

Benefits

The benefits of this invention are primarily economic. It is designed to be cheap and easy to manufacture, assemble, and maintain. Complex glass-grinding machinery is not required, allowing the mirror to be produced with common machining equipment. The mirrored film does have a shorter estimated lifespan than glass, but it can be replaced within minutes, and at a relatively low cost.

The comparatively low mass and low cost of the mirror facilitate easy astronomical observations in the field, or locations without a modern infrastructure. The active tuning system does require electrical power to run, but this can be provided by a simple battery.

Unlike glass mirrors, a flexible film is not limited to a single focal length. The fluid pressure and electric fields can be adjusted to shift the focus from infinity, allowing the telescope to be used for terrestrial surveying. In some embodiments, the invention is scaled up for use in space-based telescopes, where the low mass provides the greatest advantage.

The low cost of this telescope mirror opens the door to new astronomers. Large-diameter telescopes, which currently are well out of the price range for all but large institutions, would become widely available to the amateur community. The amateur community is integral—perhaps even vital—to astronomical discovery.

BRIEF DESCRIPTION OF THE DRAWINGS

FIGS. 1A, 1B, 1C, and 1D show different aspects of an embodiment of the telescope system 100 of the present invention.

FIG. 4 shows an embodiment using a secondary mirror, and an embodiment using an alternative laser calibration system.

DESCRIPTION OF PREFERRED EMBODIMENTS

Although the following detailed description contains many specifics for the purpose of illustration, a person of ordinary skill in the art will appreciate that many variations and alterations to the following details are within the scope of the invention. Very narrow and specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1A:
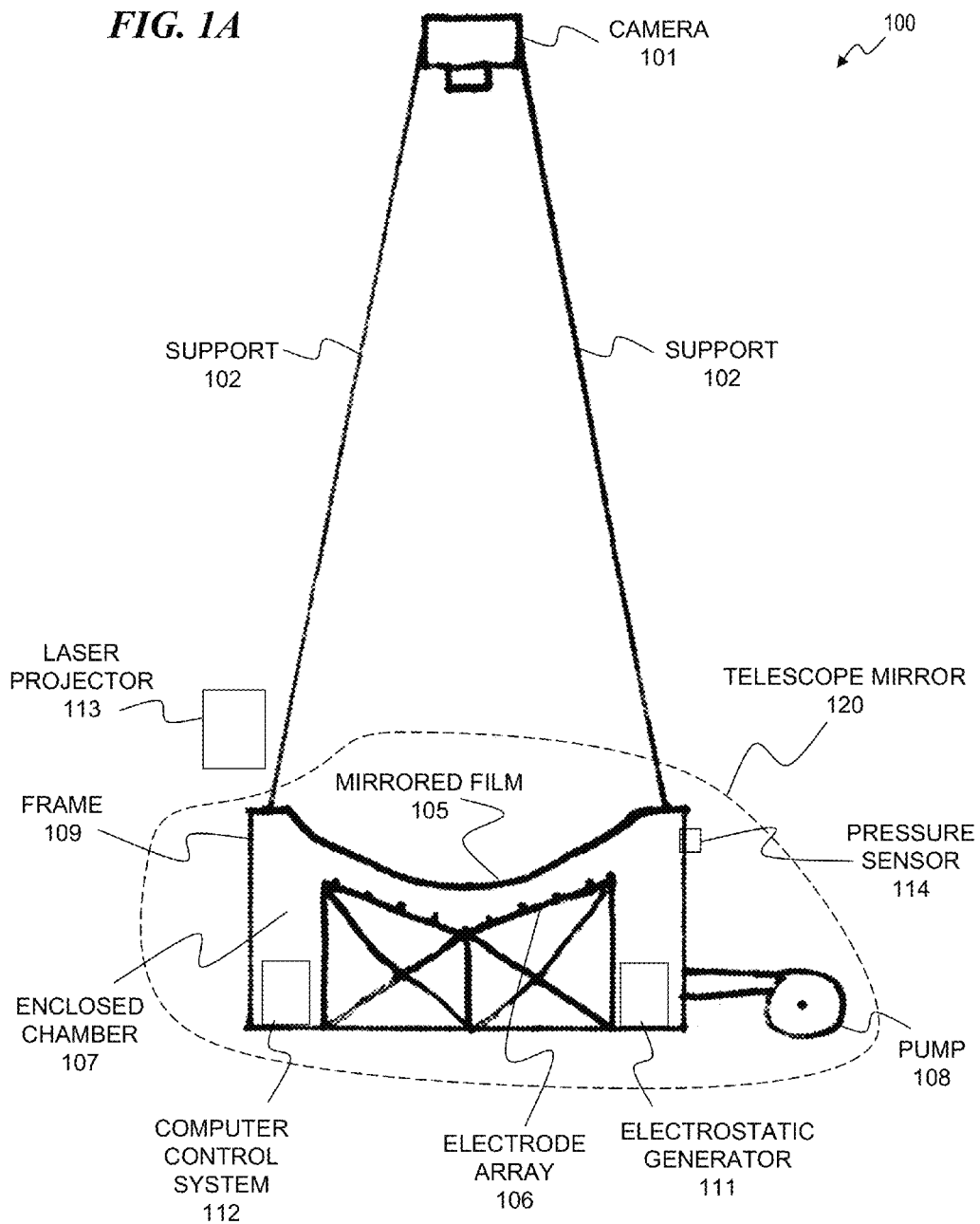

FIGS. 1A, 1B, 1C, and 1D show different aspects of an embodiment of telescope system 100 of the present invention. As shown in FIG. 1A, camera 101 is supported by one or more supports 102. In some embodiments, one support 102 supports camera 101. In other embodiments, two supports 102 support camera 101. In yet other embodiments, three, or four, or more supports 102 support camera 101. In some embodiments, camera 101 and mirrored film 105 may be placed on entirely different, independent structures. As used herein, the terms mirrored film and reflective film are synonymous. In some embodiments, mirrored film 105 includes at least one electrically-conductive layer, which, in combination with electrode array 321, 322, and/or 323 (see FIG. 3 below) provides an electrostatic film-distortion function.

In some embodiments, mirrored film 105 comprises a thin sheet of biaxially-oriented polyethylene terephthalate (also known as Mylar®) which has been coated with a thin layer of metal. In some embodiments, the metal is gold. In some embodiments, the metal is aluminum. In some embodiments, the metal is silver. In some embodiments, the metal is some other suitably optically reflective and electrically conductive metal. Such films are commercially available, and are manufactured through a variety of well-known methods. In some embodiments, mirrored film 105 comprises a thin sheet of biaxially-oriented polyethylene terephthalate which has been coated with a thin layer of other suitably optically reflective and electrically conductive material. In other embodiments, a dielectric mirror having a plurality of pairs of layers of dielectric material, each having a thickness that increases reflectivity of the structure as a whole, such as described in U.S. Pat. No. 5,907,436 entitled "Multilayer dielectric diffraction gratings" issued May 25, 1999 to Perry et al., which is incorporated herein by reference, is used. In some embodiments, a combination of metal and a plurality of dielectric layers is used, such as described in U.S. Pat. No. 6,754,006 entitled "Hybrid metallic-dielectric grating" issued Jun. 22, 2004 to Barton et al., which is incorporated herein by reference.

In other embodiments, the mirrored film 105 comprises a thin sheet of polypropylene which has been coated with a thin layer of metal, or other conductive material as described above, and elsewhere in this application. In some embodiments, the mirrored film 105 comprises a thin sheet of polyester. In some embodiments, the mirrored film 105 comprises a thin sheet of polyethylene. In some embodiments, the mirrored film 105 comprises a thin sheet of polyimide. In some embodiments, the mirrored film 105 comprises a thin sheet of polytetrafluoroethylene. In some embodiments, the mirrored film 105 comprises a thin sheet of solid metal without a substrate. In some embodiments, the mirrored film 105 comprises some other suitable material.

The mirrored film 105 is stretched taut across a frame 109, forming a seal. This forms an enclosed chamber 107. In some embodiments, the opening of frame 109, to which the mirrored film 105 is attached, or across which the mirrored film 105 is stretched, is in the shape of a circle. In other embodiments, the opening of frame 109 may be in another shape. In some embodiments, the mirror film 105 has a thickness less than 0.05 mm. In some embodiments, the mirror film 105 has a thickness of between 0.05 mm and 0.12 mm. In some embodiments, the mirror film 105 has a thickness of between 0.12 mm and 0.30 mm. In some embodiments, the mirror film 105 has a thickness of between 0.30 mm and 1.00 mm. In some embodiments, the mirror film 105 has a thickness of between 1.00 mm and 5.00 mm. In other embodiments, the mirror film 105 has a thickness greater than 5.00 mm, which is suitable to deforming to the optically suitable shape. In some embodiments, the mirror film 105 is such as available from McMaster-Carr based in Elmhurst, Ill.

In some embodiments, the opening of frame 109 is a rectangle. In some embodiments, the opening of frame 109 is a hexagon. In some embodiments, the opening of frame 109 is an octagon. In some embodiments, the opening of frame 109 is an oval. In other embodiments, the opening of frame 109 is some other suitable shape.

In some embodiments in which frame 109 is in the shape of a circle, the diameter of the circle is between 0.1 and 0.2 m. In some embodiments in which frame 109 is in the shape of a circle, the diameter of the circle is between 0.2 and 0.3 m. In some embodiments in which frame 109 is in the shape of a circle, the diameter of the circle is between 0.3 and 0.4 m. In some embodiments in which frame 109 is in the shape of a circle, the diameter of the circle is between 0.4 and 0.5 m. In some embodiments in which frame 109 is in the shape of a circle, the diameter of the circle is between 0.5 and 0.6 m. In some embodiments in which frame 109 is in the shape of a circle, the diameter of the circle is between 0.6 and 0.7 m. In some embodiments in which frame 109 is in the shape of a circle, the diameter of the circle is between 0.7 and 0.8 m. In some embodiments in which frame 109 is in the shape of a circle, the diameter of the circle is between 0.8 and 0.9 m. In some embodiments in which frame 109 is in the shape of a circle, the diameter of the circle is between 0.9 and 1.0 m. In some embodiments in which frame 109 is in the shape of a circle, the diameter of the circle is between 1.0 and 1.25 m. In some embodiments in which frame 109 is in the shape of a circle, the diameter of the circle is between 1.25 and 1.5 m. In some embodiments in which frame 109 is in the shape of a circle, the diameter of the circle is between 1.5 and 1.75 m. In some embodiments in which frame 109 is in the shape of a circle, the diameter of the circle is between 1.75 and 2.0 m. In some embodiments in which frame 109 is in the shape of a circle, the diameter of the circle is between 2.0 and 3.0 m. In some embodiments in which frame 109 is in the shape of a circle, the diameter of the circle is between 3.0 and 4.0 m. In some embodiments in which frame 109 is in the shape of a circle, the diameter of the circle is between 4.0 and 5.0 m. In some embodiments in which frame 109 is in the shape of a circle, the diameter of the circle is between 5.0 and 6.0 m. In some embodiments in which frame 109 is in the shape of a circle, the diameter of the circle is between 6.0 and 10.0 m. In some embodiments in which frame 109 is in the shape of a circle, the diameter of the circle is between 10.0 and 15.0 m. In some embodiments in which frame 109 is in the shape of a circle, the diameter of the circle is between 15.0 and 20.0 m. In some embodiments in which frame 109 is in the shape of a circle, the diameter of the circle is greater than 20.0 m.

In some embodiments in which the opening of frame 109 is non-circular, the area of the opening covered by the mirrored film 105 is between 10 and 100 cm$^2$. In some embodiments in which the opening of frame 109 is non-circular, the area of the opening covered by the mirrored film 105 is between 100 and 200 cm$^2$. In some embodiments in which the opening of frame 109 is non-circular, the area of the opening covered by the mirrored film 105 is between 200 and 400 cm$^2$. In some embodiments in which the opening of frame 109 is non-circular, the area of the opening covered by the mirrored film 105 is between 400 and 1,000 cm$^2$. In some embodiments in which the opening of frame 109 is non-circular, the area of the opening covered by the mirrored film 105 is between 1,000 and 5,000 cm$^2$. In some embodiments in which the opening of frame 109 is non-circular, the area of the opening covered by the mirrored film 105 is between 5,000 and 10,000 cm$^2$. In some embodiments in which the opening of frame 109 is non-circular, the area of the opening covered by the mirrored film 105 is between 10,000 and 20,000 cm$^2$. In some embodiments in which the opening of frame 109 is non-circular, the area of the opening covered by the mirrored film 105 is between 20,000 and 50,000 cm$^2$. In some embodiments in which the opening of frame 109 is non-circular, the area of the opening covered by the mirrored film 105 is between 50,000 and 100,000 cm$^2$. In some embodiments in which the opening of frame 109 is non-circular, the area of the opening covered by the mirrored film 105 is between 100,000 and 500,000 cm². In some embodiments in which the opening of frame 109 is non-circular, the area of the opening covered by the mirrored film 105 is between 500,000 and 1,000,000 cm². In some embodiments in which the opening of frame 109 is non-circular, the area of the opening covered by the mirrored film 105 is between 1,000,000 and 5,000,000 cm². In some embodiments in which the opening of frame 109 is non-circular, the area of the opening covered by the mirrored film 105 is between 5,000,000 and 10,000,000 cm². In some embodiments in which the opening of frame 109 is non-circular, the area of the opening covered by the mirrored film 105 is greater than 10,000,000 cm².

In some embodiments, a peristaltic pump 108 is used to reduce the fluid pressure (such as air pressure) in the enclosed chamber 107, causing the mirrored film 105 to deform into a rough parabola. In other embodiments, the mirror film 105 is deformed into a rough hyperbola. In other embodiments, the mirror film 105 is deformed into a rough spheroid. In other embodiments, the mirror film 105 is deformed into another optically suitable shape. In other embodiments, other sorts of pumps are used. In some embodiments, fluids other than air used to provide the pressure differential across the mirrored film 105. In some embodiments, such as certain spaced-based applications, no air or other fluid is used to provide the initial rough-parabolic deformation.

In some embodiments, the enclosed chamber 107 is filled with a fluid which is a gas (such as air or one or more other suitable gasses), while in other embodiments, the enclosed chamber 107 is filled with a fluid which is a liquid (such as a dielectric fluid such as deionized non-conductive water, ethylene glycol, an electrically insulating, stable fluorocarbon-based fluid such as Fluorinert® available from 3M Corporation, or the like).

In some embodiments, electrode array 106 is used to further deform the mirrored, electrically conductive film 105 into a substantially optically perfect parabola. The mirrored film 105 is connected to one polarity of an electrostatic generator 111. A selected value (e.g., charge, or voltage) of the same polarity, or of the opposite polarity, of the electrostatic generator 111 is connected to selected ones of the individual electrodes of the electrode array 106, based on the calculated error of the mirror shape, as described below. (In other words, a particular one of the electrodes is driven by a signal corresponding to that electrode, based on the mirror-shape-measurement calculation derived from the laser pattern projector 113 for that electrode.) Electrical circuits of a computer-control system 112, suitably programmed, control the voltages of the electrodes (such as elements 321, 322, or 323 in FIG. 3A, 3B, or 3C, and elements 623 in FIG. 6) in the electrode array 106. The electric potential between the individual points on the electrode array 106 and the mirrored film 105 create an electrostatic attractive force. This force further deforms the mirrored film 105. If the voltages of the electrodes are suitably controlled, the mirrored film 105 will be deformed, in some embodiments into an optically suitable parabola. In other embodiments, the mirrored film 105 will be deformed into an optically suitable hyperbola. In other embodiments, the mirrored film 105 will be deformed into an optically suitable spheroid. In other embodiments, the mirrored film 105 will be deformed into another optically suitable shape. In some embodiments, computer-control system 112 controls some other, or all other, of the elements of telescope system 100. In some embodiments, the computer-control system 112 is connected to the other elements of the telescope with electrical wires. In some embodiments, the computer-control system 112 is connected to the other elements of the telescope with fibre-optic cables. In some embodiments, the computer-control system 112 is connected to the other elements of the telescope wirelessly. In some embodiments, the computer-control system 112 is connected to the other elements of the telescope with a combination of the means previously described.

In some embodiments, some of the electrodes may be driven by the same polarity as that of the mirrored film 105, in order to generate a variable amount of repulsive electrostatic force, while others of the electrodes may be driven by opposite polarity as that of the mirrored film 105, in order to generate an attractive electrostatic force. The amount of electrostatic force can be varied by applying different magnitudes of voltage.

In other embodiments (not shown), electrostatic generator 111 generates an electric potential which is routed to computer control system 112, which then sends individually controlled voltages to the individual electrodes (such as electrodes 323 shown in FIG. 3C) of the electrode array 106. In some embodiments (not shown), the electrostatic generator 111 is not contained within the enclosed chamber 107.

In other embodiments, the electrode array 106 comprises conductors in the form of concentric rings placed on a flat nonconductive substrate. Each ring is individually controlled by a suitable algorithm executed by the computer-control system 112 (control system 112 executes all algorithms described in this specification) to control the voltage of the rings, causing the mirrored, electrically conductive film 105 to deform into an optically suitable shape, as described elsewhere in this application.

In other embodiments, the electrode array 106 comprises a set of printed-circuit boards which have been arranged into a three-dimensional polygon. Each circuit board has numerous individual electrodes on its surface, each connected to the electrostatic generator 111 which is controlled by the computer-control system 112.

Referring to FIG. 1A, in some embodiments a pressure sensor 114 is used to measure the pressure differential between the enclosed chamber 107 and the surrounding environment. The measurement is used by the computer control system 112, executing instructions (such as a suitable algorithm), to better control the pump or valves.

In some embodiments, such as shown in FIG. 1C, laser projector 113 projects a known pattern onto the mirrored, electrically conductive film 105. This laser light reflects to the camera 101, which sends a signal to the computer control system 112. A suitable algorithm executed in the computer control system 112 uses the image from the camera 101 in order to vary, via electrostatic generator 111, the voltages of individual electrodes of the electrode array 106, in a manner which corrects defects in the shape of the mirrored film 105, to obtain, in some embodiments, a more perfect parabola. In other embodiments, the suitable algorithm causes mirrored film 105 to be shaped into a more perfect hyperbola. In other embodiments, the suitable algorithm causes mirrored film 105 to be shaped into a more perfect spheroid. In other embodiments, the suitable algorithm causes mirrored film 105 to be shaped into a different more perfect optically suitable shape.

Figure 1B:
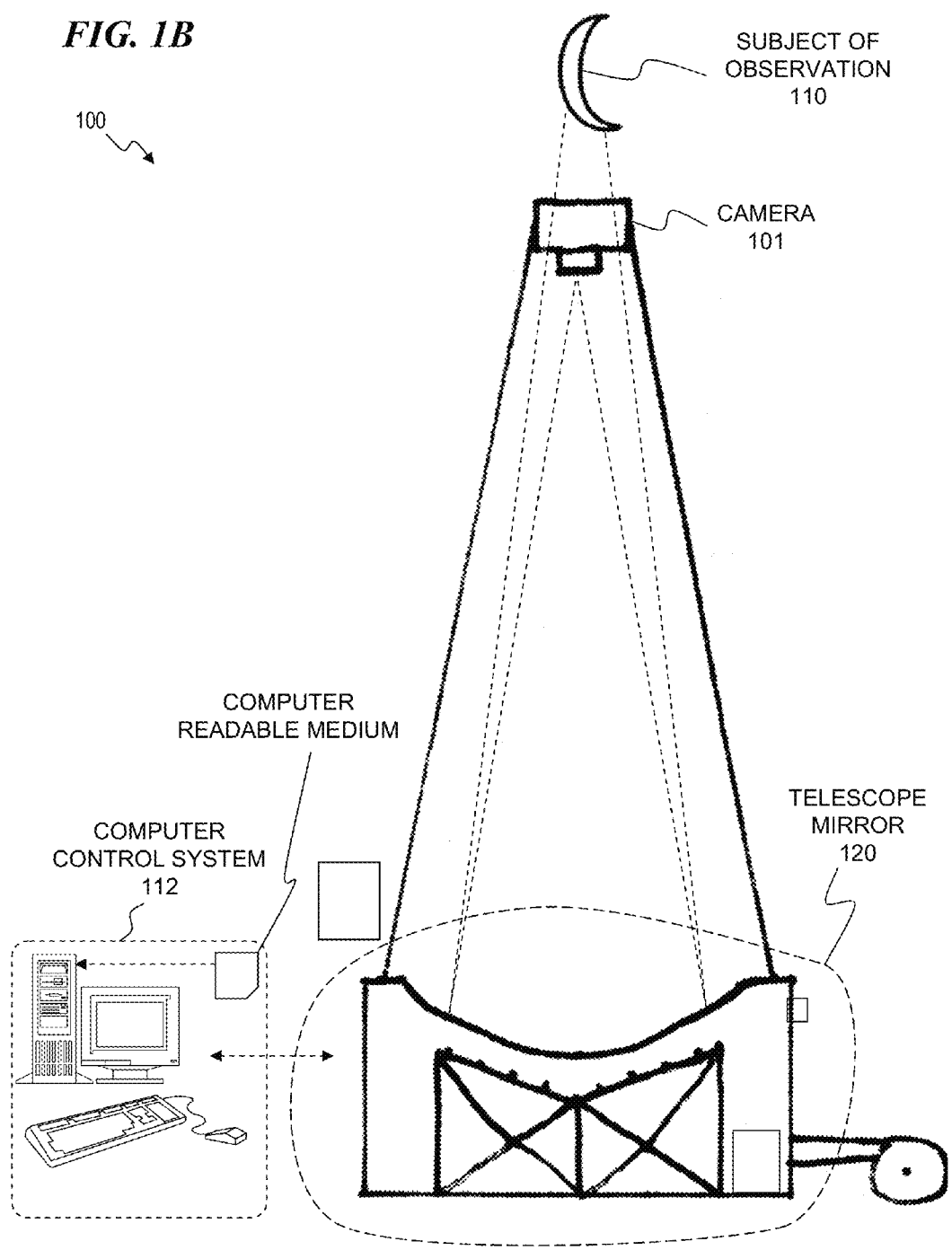

As shown in FIG. 1B, the telescope mirror 120 is aimed at a subject of observation 110 to be viewed. Light strikes the mirrored film 105, and is reflected back to the camera 101. In some embodiments. In some embodiments, an eyepiece is used instead of a camera 101.

In some embodiments, the pump 108 is used to create a pressure differential between enclosed chamber 107 and the surrounding environment. In some embodiments, the pump 108 is controlled by a stepper motor, servo-motor, or other mechanism. In other embodiments, a different positive displacement pump may be used to create the pressure differential. In some embodiments, the pump 108 is operably coupled to the enclosed chamber 107 through a flexible hose.

Figure 1D:
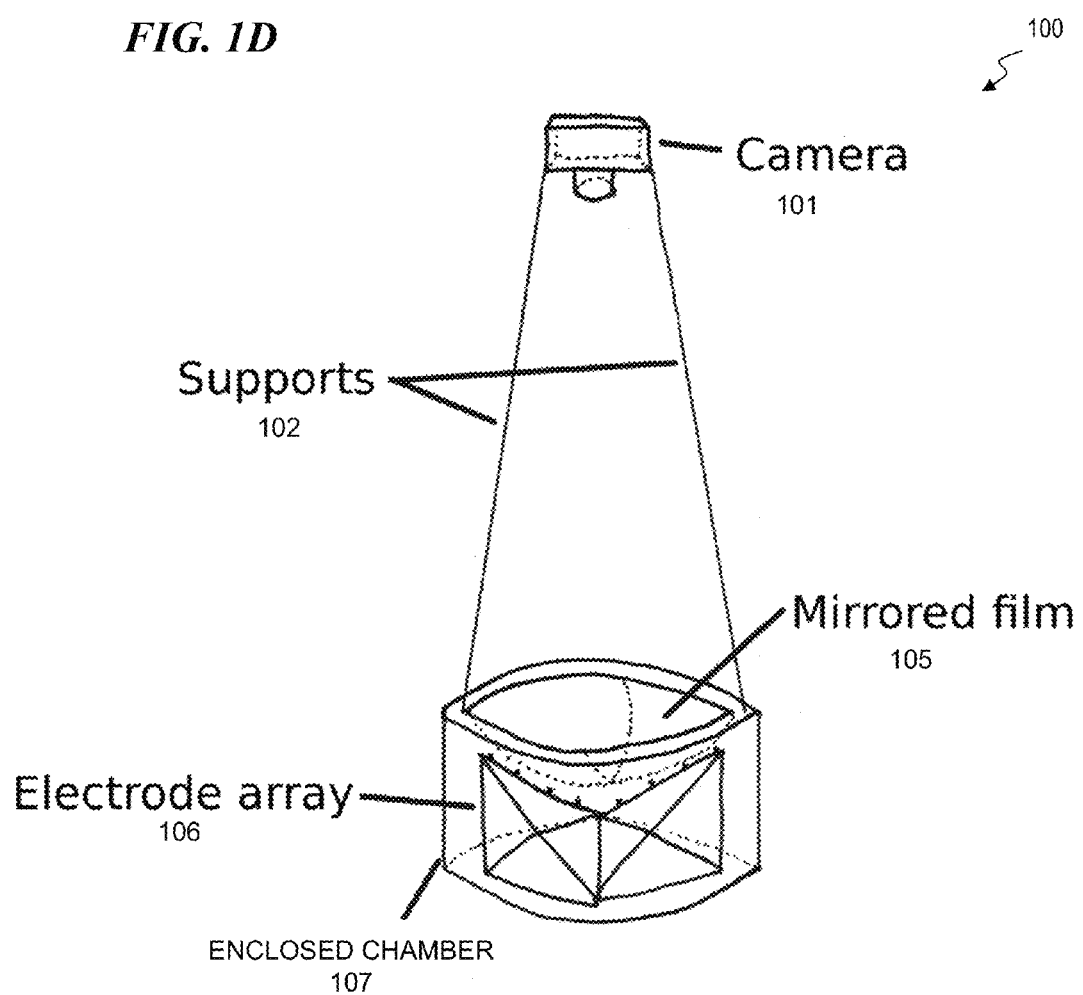

FIG. 1D is an isometric view of the telescope 100. Shown are elements: camera 101, supports 102, mirrored film 105, electrode array 106, and enclosed chamber 107. Other elements of the telescope 100 are not shown.

Figure 2:
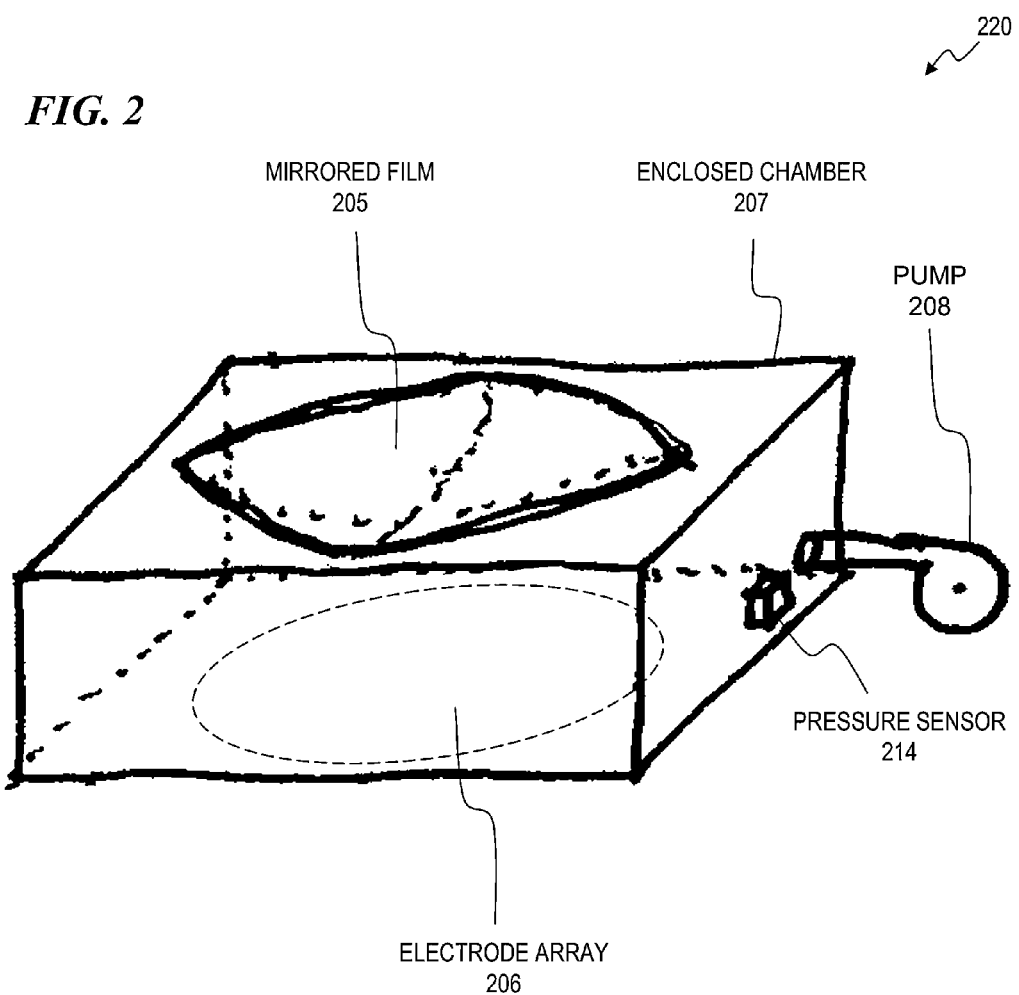
FIG. 2 is an isolated view of an embodiment of the telescope mirror 220.

FIG. 2 is an isolated view of an embodiment of the telescope mirror 220. Shown are elements mirrored film 205, enclosed chamber 207, pump 208, pressure sensor 214, and electrode array 206. Other elements of the telescope mirror 220 are not shown.

Figure 3A:
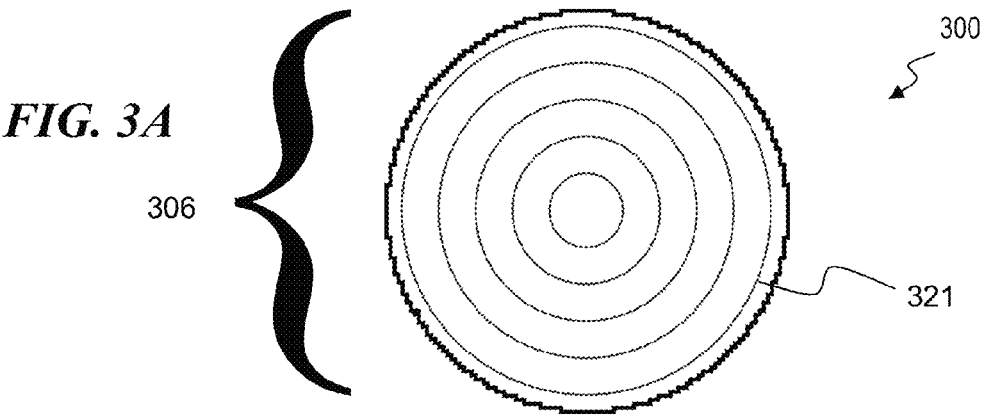
FIGS. 3A, 3B, and 3C show different embodiments of the electrode array.
Figure 3B:
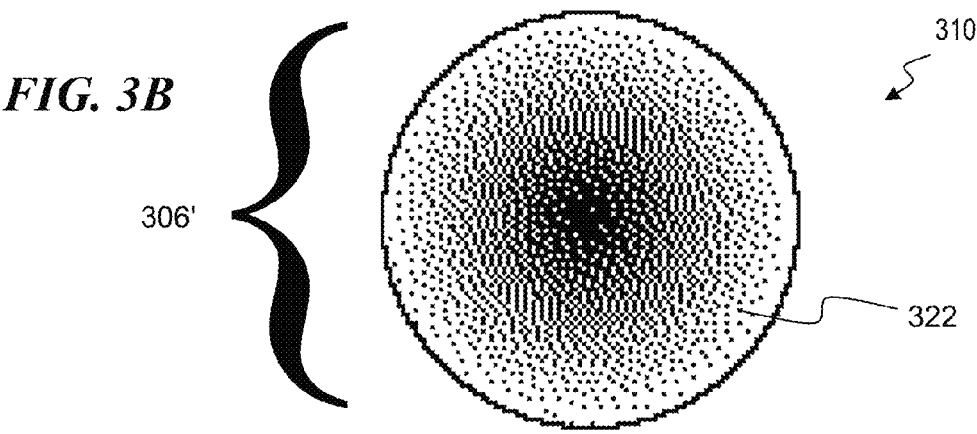
Figure 3C:
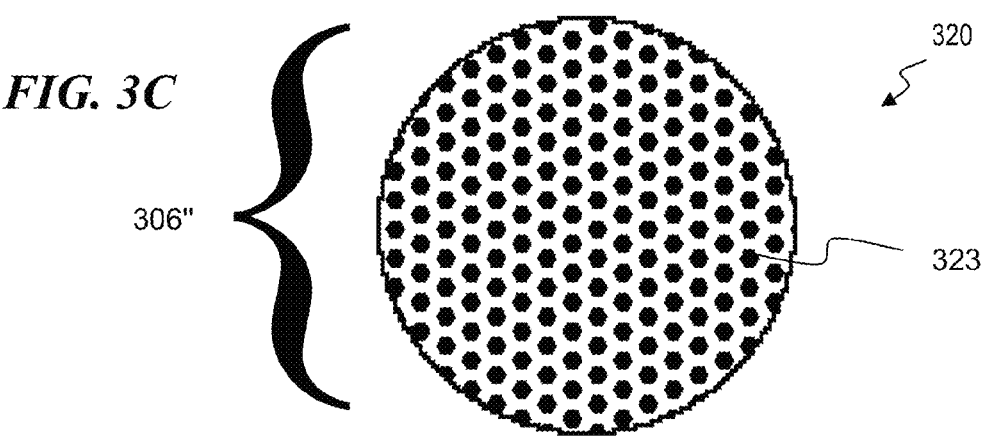

FIGS. 3A, 3B, and 3C show different embodiments of the electrode array, which is used to control the shape of the telescope's mirrored film (such as described elsewhere in this application as element 105 in FIG. 1). FIG. 3A shows an embodiment 300 in which concentric conductive rings are utilized as the electrode array. In some embodiments, these concentric conductive rings 321 comprise metal etched on a printed-circuit board. In some embodiments, these concentric conductive rings 321 comprise conductive rings attached to a suitable nonconductive substrate. In some embodiments, the suitable nonconductive substrate is flat. In some embodiments, the suitable nonconductive substrate is not flat. In some such embodiments, the suitable nonconductive substrate roughly conforms to the desired final shape of the deformed mirrored film 105. In some embodiments, there are between 1 and 10 concentric conductive rings 321. In some embodiments, there are between 10 and 20 concentric conductive rings 321. In some embodiments, there are between 20 and 40 concentric conductive rings 321. In some embodiments, there are between 40 and 80 concentric conductive rings 321. In some embodiments, there are between 80 and 150 concentric conductive ring 321. In some embodiments, there are between 150 and 300 concentric conductive rings 321. In some embodiments, there are between 300 and 500 concentric conductive rings 321. In some embodiments, there are between 500 and 1,000 concentric conductive rings 321. In some embodiments, there are more than 1,000 concentric conductive rings 321. The individual concentric conductive rings 321 are controlled by a suitable algorithm, executed in a computer control system (such as shown elsewhere in this application as element 112 in FIG. 1), controlling the voltage of each ring. The electrostatic attraction causes the mirrored film (such as shown elsewhere in this application as element 105 in FIG. 1) to deform into an optically suitable shape, as described elsewhere in this application.

FIG. 3B shows an embodiment 310 in which a precision gradient of resistive medium is utilized as electrode array 306'. The electrode array 306' comprises a single conductor in the form of a precision gradient of resistive medium 322 placed on a suitable substrate. In some embodiments, the substrate is electrically conductive. In some embodiments, the substrate is not electrically conductive. In some embodiments, the suitable nonconductive substrate is flat. In some embodiments, the suitable nonconductive substrate is not flat. In some such embodiments, the suitable nonconductive substrate roughly conforms to the desired final shape of the deformed mirrored film 105. The gradient 322 is controlled by a suitable algorithm, executed in a computer control system (such as shown elsewhere in this application as element 112 in FIG. 1), controlling the voltage of a single input electrode. The measured voltage of individual points on the surface of the precision gradient will vary according to the distance from the centre, and according to the voltage of the single input electrode. The electrostatic attraction causes the mirrored film (such as shown elsewhere in this application as element 105 in FIG. 1) to deform into an optically suitable shape, as described elsewhere in this application. In some embodiments, the resistive medium comprises graphite. In other embodiments, the resistive medium comprises a metal film. In yet other embodiments, the resistive medium comprises a conductive polymer. In some embodiments, the precision gradient of resistive medium 322 is created by a laser which etches the surface of a layer of resistive medium according to predefined pattern.

FIG. 3C shows an embodiment 320 in which discrete electrode points 323 are utilized as electrode array 306". In some embodiments, these discrete electrode points 323 comprise metal etched on a printed circuit board. In some embodiments, these discrete electrode points 323 comprise a conductor attached to a suitable nonconductive substrate. In some embodiments, the suitable nonconductive substrate is flat. In some embodiments, the suitable nonconductive substrate is not flat. In some such embodiments, the suitable nonconductive substrate roughly conforms to the desired final shape of the deformed mirrored film 105. In some embodiments, there are between 1 and 10 discrete electrode points 323. In some embodiments, there are between 10 and 20 discrete electrode points 323. In some embodiments, there are between 20 and 40 discrete electrode points 323. In some embodiments, there are between 40 and 80 discrete electrode points 323. In some embodiments, there are between 80 and 150 discrete electrode points 323. In some embodiments, there are between 150 and 300 discrete electrode points 323. In some embodiments, there are between 300 and 500 discrete electrode points 323. In some embodiments, there are between 500 and 1,000 discrete electrode points 323. In some embodiments, there are more than 1,000 discrete electrode points 323. The discrete electrode points 323 are controlled by a suitable algorithm, executed in a computer control system (such as shown elsewhere in this application as element 112 in FIG. 1), controlling the voltage of the discrete electrode points 323. The electrostatic attraction causes the mirrored film (such as shown elsewhere in this application as element 105 in FIG. 1) to deform into an optically suitable shape, as described elsewhere in this application.

In some embodiments, the discrete electrode points 323 are arranged in evenly spaced rows and columns. In some embodiments, the discrete electrode points 323 are arranged on a hexagonal grid. In some embodiments, the discrete electrode points 323 are arranged in an uneven distribution, with areas of higher electrode density. In other embodiments, the discrete electrode points 323 are arranged in other suitable patterns.

In some embodiments, the closest point on electrode array 106 is located at a distance of less than 1 mm from the mirrored film 105. In some embodiments, the closest point on electrode array 106 is located at a distance between 1 and 5 mm from the mirrored film 105. In some embodiments, the closest point on electrode array 106 is located at a distance between 5 and 10 mm from the mirrored film 105. In some embodiments, the closest point on electrode array 106 is located at a distance between 10 and 20 mm from the mirrored film 105. In some embodiments, the closest point on electrode array 106 is located at a distance between 20 and 50 mm from the mirrored film 105. In some embodiments, the closest point on electrode array 106 is located at a distance between 50 and 100 mm from the mirrored film 105. In some embodiments, the closest point on electrode array 106 is located at a distance between 100 and 200 mm from the mirrored film 105. In some embodiments, the closest point on electrode array 106 is located at a distance greater than 200 mm from the mirrored film 105.

In some embodiments, the electrodes used in the electrode array 106 comprise an electrically conductive metal. In some such embodiments, the metal is copper. In other such embodiments, the metal is aluminium. In other such embodiments, the metal is gold. In other such embodiments, the metal is silver. In other such embodiments, the metal is steel. In other such embodiments, a suitable conductive metal is used. In some embodiments, the electrodes used in the electrode array 106 comprise carbon. In some embodiments, the electrodes used in the electrode array 106 comprise a conductive polymer. In other embodiments, the electrodes used in the electrode array 106 comprise some other suitable conductive material.

In some embodiments, the different electrode array 106 configurations as described elsewhere in this application are used concurrently, or in combination with one another.

As shown in FIG. 4, in some embodiments there are one or more secondary mirrors 412 altering the light path to the camera 401. This prevents the camera 401 from blocking incoming light. The secondary mirror 412 may be used in conjunction with other embodiments of the invention. In some embodiments, the secondary mirror 412 is supported by one or more supports 402. In some embodiments, one support 402 supports secondary mirror 412. In other embodiments, two supports 402 support secondary mirror 412. In yet other embodiments, three, or four, or more supports 402 support secondary mirror 412. In some embodiments, secondary mirror 412 and mirrored film 405 may be placed on entirely different, independent structures.

In some embodiments, instead of a laser grid projector projecting a pattern onto the first surface of the mirrored film 405 and being reflected into the camera 401, a laser 404 projects a point onto the second surface of mirrored film 405, which is reflected to a photosensor array 402, such as shown in FIG. 4. A suitable algorithm, executed in computer control system 412, uses the data from the photosensor array 402 to control the pressure differential between the enclosed chamber 407 and the surrounding environment, in order to create a suitable shape as described elsewhere in this application.

In the embodiment shown in FIG. 4, no electrostatic control system is being used, and the shaping of mirrored film 405 is accomplished entirely with a pressure differential across the mirrored film 405. In other embodiments, the mirrored film 405 may be further shaped using the electrostatic control system described elsewhere in this application, but not shown in FIG. 4.

Figure 5:
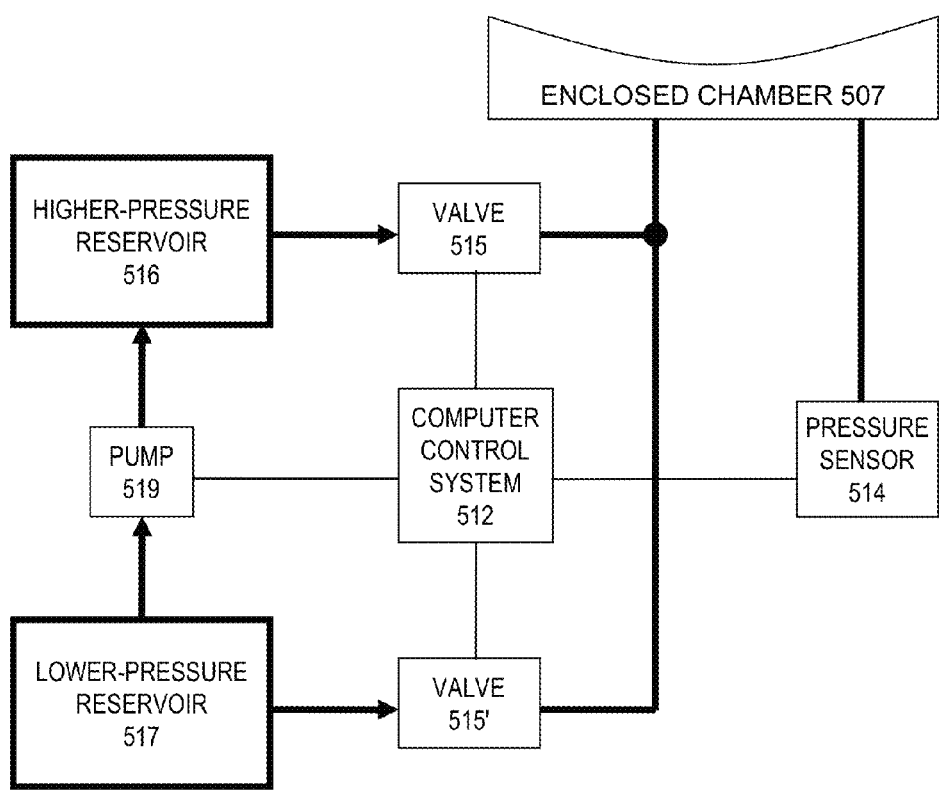
FIG. 5 is a schematic of an embodiment using pressure reservoirs and valves.

In other embodiments, such as shown in FIG. 5, which shows a schematic of the pressure control system, the pressure differential, monitored by pressure sensor 514, is maintained by a higher-pressure reservoir 516 and a lower-pressure reservoir 517, each connected to the enclosed chamber 507 with valves 515 controlled by a suitable algorithm executed in the computer control system 512. A pump 519 creates a pressure differential between the higher- and lower-pressure reservoirs. When the computer control system 512 determines the pressure in enclosed chamber 507, as measured by pressure sensor 514, is too low, valve 515 is opened to allow high pressure fluid to pass from the high-pressure reservoir 516 to the enclosed chamber 507. When the computer control system 512 determines the pressure in enclosed chamber 507, as measured by pressure sensor 514, is too high, valve 515' is opened to allow high pressure fluid to pass from the enclosed chamber 507 to the low-pressure reservoir 517.

Figure 6:
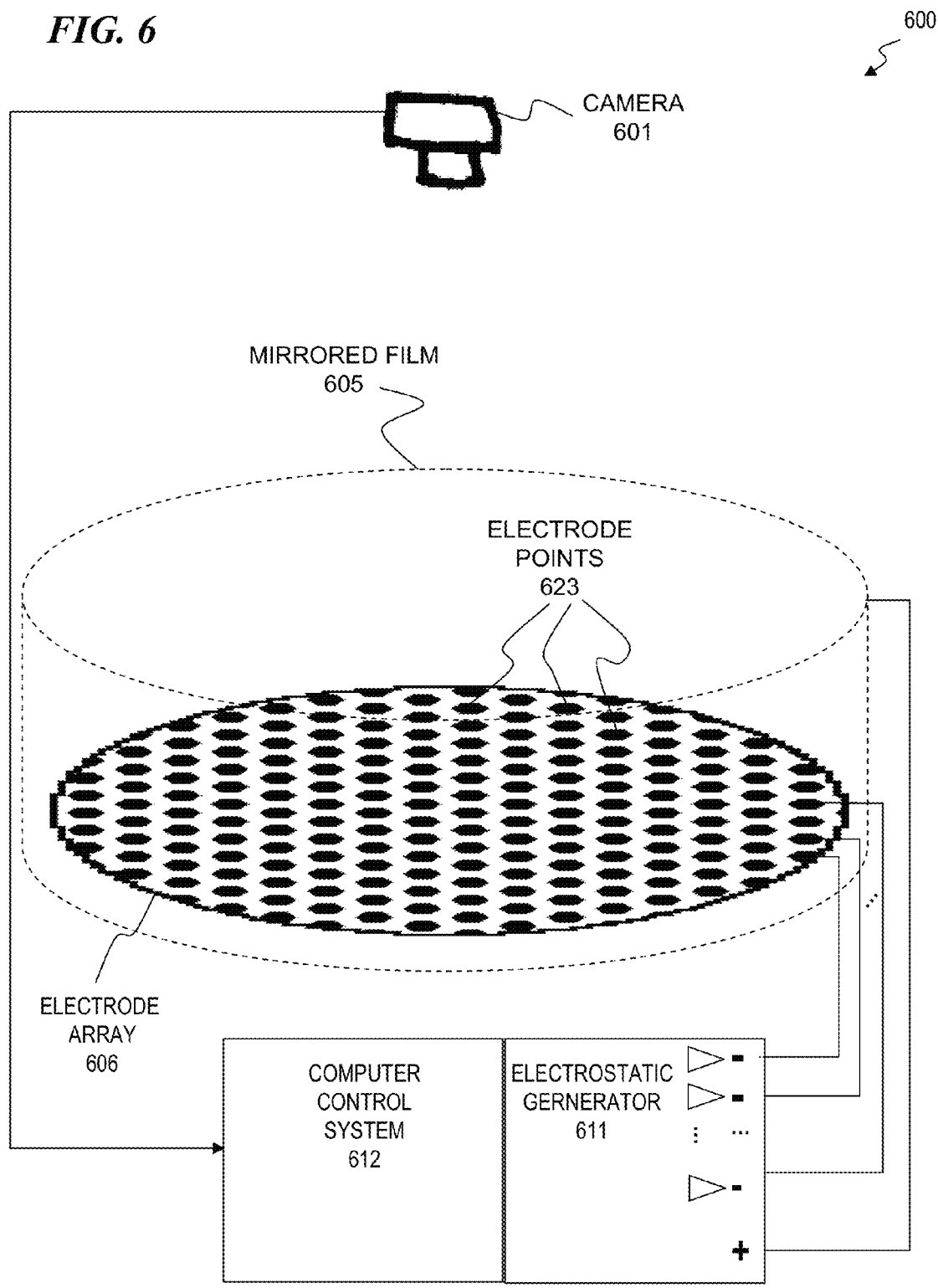
FIG. 6 is a view of an embodiment of the electrostatic feedback system.

FIG. 6 is a view of an embodiment of electrostatic feedback system 600. In some embodiments, a camera 601 is positioned to obtain an image of mirrored film 605, which is located adjacent an electrode array 606 having a plurality of electrode points 623. In some embodiments, camera 601 is connected to computer control system 612, which is connected to electrostatic generator 611. In some embodiments, electrostatic generator 611 includes a plus "+" output terminal that is connected to mirrored film 605, and a plurality of minus "−" output terminals each of which is connected to a respective one of the plurality of electrode points 623.

Figure 7:
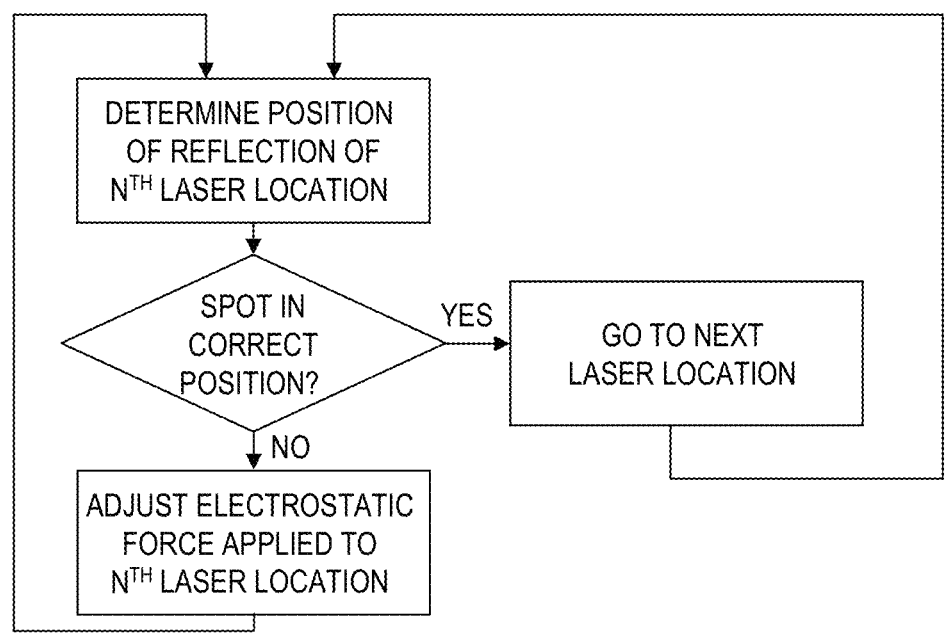
FIG. 7 is a flowchart of an embodiment of the algorithm used to finely regulate the shape of the telescope mirror.

In some embodiments such as shown in FIG. 7, an algorithm as depicted in the flowchart is used to finely regulate the shape of the telescope mirror.

In some embodiments, instead of projecting a laser grid pattern on the first surface of mirrored film 105, the reflection of which is captured by camera 101, light from a laser star guide, such as described in U.S. Patent Application Publication No. US 2012/0224243 of Friedenauer et al., titled "Laser system to generate a laser guide star," which is incorporated herein by reference, is used. Friedenauer et al. describe a laser system which includes a laser light source which emits electromagnetic radiation, at least one optical amplifier which amplifies the radiation emitted from the laser light source, and a frequency multiplier which converts the amplified radiation by resonant frequency multiplying and/or summation-frequency generating. The laser system has a modulation facility which causes a modulation of the electromagnetic radiation emitted from the laser light source in such a manner that the spectrum encompasses a carrier frequency and at least one sideband, with the frequency multiplier being resonant at the carrier frequency and at the frequency of the at least one sideband.

General Method of Operation

According to one embodiment of the invention, a film of aluminized biaxially-oriented polyethylene terephthalate, commonly known as Mylar®, is stretched over a circular frame. A vacuum pump is used to reduce the pressure in a sealed chamber behind the mirrored film, which is monitored by a pressure sensor. The difference in air pressure across the film causes it to deform into a concave parabola.

In some such embodiments, while very close, this vacuum-formed parabola is not precise enough on its own to form a sharp image of the subject. To calibrate the mirror to a more perfect parabola, a laser is used to project a precise grid onto the mirror. A conventional digital camera detects the lines, and an algorithm measures irregularities in the grid to calculate the optical distortion. Feedback is sent to an array 106 of high-voltage electrodes, which create an electrostatic attraction between the mirror 105 and the array 106. The differing electric field strength fine-tunes the mirror distortion, correcting it to bring an image into clear focus. Several rounds of calibration may be needed to perfect the parabola. Once complete, the laser is turned off, and the camera is used to view an image. The image is stable for several hours of observation.

In some embodiments, the present invention provides an apparatus which includes: a mirrored, electrically conductive film stretched across a frame in a manner which creates a seal and an enclosed chamber beneath the mirrored film; a pump with its input side open to the enclosed chamber beneath the mirrored film; an electrode array located beneath the mirrored film; a camera supported at a distance from the mirrored film; a computer-control system operably coupled to the pump, the electrode array, and the camera, to shape the mirrored film into an optically suitable shape. In some such embodiments, the apparatus is used as a telescope.

Some embodiments further include algorithms which, when executed by the computer-control system, use input signals to the computer-control system from the camera, and output signals from the computer-control system to the pump and to the electrode array, to shape the thin mirrored film to an optically suitable shape.

Some embodiments further include a laser pattern projector which projects a pattern onto the mirrored, electrically conductive film, the reflection of which is captured by the camera supported at a distance above the mirrored film, which sends signals to the computer-control system, upon which an algorithm is executed which sends signals to appropriate electrodes of the electrode array in a manner which creates an electrostatic attraction to appropriate locations on the thin mirrored film, resulting in the film's acquiring an optically suitable shape.

Some embodiments further include a second laser which reflects light off the mirrored, electrically conductive film and onto a separate photosensor array, which sends signals to the computer-control system, upon which an algorithm is executed which sends signals to appropriate electrodes of the electrode array in a manner which creates an electrostatic attraction to appropriate locations on the thin mirrored film, resulting in the film's acquiring an optically suitable shape.

In some embodiments, the electrode array (e.g., electrode array 106 shown in FIG. 1A) comprises flat printed-circuit boards arranged in a 3D geometric shape. In some embodiments, the electrode array comprises a plurality of concentric conductive rings. In some embodiments, the electrode array comprises a plurality of discrete electrode points. In some embodiments, the electrode array comprises a conductive material having a gradient of conductivity.

In some embodiments, a first voltage is applied to at least some of the electrodes, wherein the first voltage is opposite in sign to a second voltage applied to the mirrored, electrically conductive film, in order to create an attractive electrostatic force to a selective area of the film.

In some embodiments, a third voltage is applied to at least some of the electrodes, wherein the third voltage is equal in sign to a second voltage applied to the mirrored, electrically conductive film, in order to create an repulsive electrostatic force to a selective area of the film.

In some embodiments, the present invention provides an apparatus which includes: a frame; a mirrored, electrically conductive film having a first face which is highly reflective and a second face facing the frame, wherein the mirrored, electrically conductive film is stretched across the frame in a manner which creates an enclosed chamber against the second face of the mirrored, electrically conductive film; a pump operably coupled to the enclosed chamber facing the second face of the mirrored, electrically conductive film; an electrode array located in the enclosed chamber facing the second face of the mirrored film; a camera facing the first face of the mirrored, electrically conductive film; and a computer-control system operably coupled receive signals from the camera, and configured to send control signals to the pump and to the electrode array, in order to reshape the mirrored, electrically conductive film into an optically suitable shape.

Some embodiments further include a computer-readable medium having instructions stored thereon which, when executed by the computer-control system, perform a method comprising: performing calculations in the computer-control system based on input signals from the camera, and outputting signals from the computer-control system to the pump and to the electrode array, to shape the mirrored, electrically conductive film to an optically suitable shape.

Some embodiments further include a first laser system which projects a pattern of light onto the first face of the mirrored, electrically conductive film, the reflection of which is captured by the camera which faces the mirrored, electrically conductive film, wherein the camera sends signals to the computer-control system, wherein the computer-control system calculates correction factors and sends signals to appropriate electrodes of the electrode array in a manner which creates an electrostatic force to one or more appropriate selected locations on the mirrored, electrically conductive film, in order to reshape the film to an optically suitable shape.

Some embodiments further include a second laser system configured to projects light toward the second face of the mirrored, electrically conductive film; and a photosensor array configured to receive light of the second laser system reflected from the second face of the film, wherein the photosensor array sends signals to the computer-control system, wherein the computer-control system calculates correction factors based on the signals from the photosensor array, and sends signals to appropriate electrodes of the electrode array in a manner which creates an electrostatic force to one or more appropriate locations on the mirrored, electrically conductive film, in order to reshape the film to an optically suitable shape.

In some embodiments, the electrode array is formed from a plurality flat printed-circuit boards arranged in a three-dimensional (3D) geometric shape. In some embodiments, the electrode array is formed from a plurality of concentric conductive rings. In some embodiments, the electrode array is formed from a plurality of discrete electrode points. In some embodiments, the electrode array is formed from a material having a gradient conductivity.

Some embodiments further include an electrically non-conductive dielectric liquid filling the enclosed chamber, wherein the pump applies force to the dielectric liquid.

In some embodiments, a gas is used in the enclosed chamber against the second face of the film, wherein the pump applies force to the gas.

In some embodiments, the present invention provides: providing a frame; providing a mirrored, electrically conductive film having a first face which is highly reflective and a second face facing the frame; stretching the mirrored, electrically conductive film across the frame in a manner which creates an enclosed chamber against the second face of the mirrored, electrically conductive film; pumping a fluid from the enclosed chamber facing the second face of the mirrored, electrically conductive film; applying an electrostatic force to one or more sub-areas of the second face of the mirrored film; acquiring an image of the first face of the mirrored, electrically conductive film; and calculating correction factors based on the acquired image; and sending control signals to control the pumping and to control the applying of electrostatic force to the one or more sub-areas of the second face of the mirrored film, in order to reshape the mirrored, electrically conductive film into an optically suitable shape.

Some embodiments further include projecting a first laser light pattern onto the first face of the mirrored, electrically conductive film, and wherein the acquiring of the image of the first face captures a reflection of the first laser light pattern, wherein the calculating of the correction factors is based on the captured reflection from the first face of the mirrored, electrically conductive film.

Some embodiments further include projecting a second laser light pattern toward the second face of the mirrored film; and receiving light of the second laser light pattern reflected from the second face of the mirrored, electrically conductive film, wherein the calculating of correction factors correction factors is based at least in part on the received light from the second face of the film.

In some embodiments, the applying of the electrostatic force includes applying selected voltages to selected electrodes of an electrode array, and wherein the electrode array is formed from a plurality flat printed circuit boards arranged in a three-dimensional (3D) geometric shape.

In some embodiments, the applying of the electrostatic force includes applying selected voltages to selected electrodes of an electrode array, and wherein the electrode array is formed from a plurality of concentric conductive rings.

In some embodiments, the applying of the electrostatic force includes applying selected voltages to selected electrodes of an electrode array, and wherein the electrode array is formed from a plurality of discrete electrode points.

In some embodiments, the applying of the electrostatic force includes applying selected voltages to selected electrodes of an electrode array, and wherein the electrode array is formed from a material having a gradient conductivity.

In some embodiments, the calculating correction factors based on the acquired image includes: determining the position of reflection of $n^{th}$ laser location; determining whether the position of reflection of $n^{th}$ laser location is in the correct position in relation to an ideal model; if the determined position of reflection of $n^{th}$ laser location is not in the correct position, adjusting the electrostatic force applied to $n^{th}$ laser location, and returning to the step of determining whether the position of reflection of $n^{th}$ laser location is in the correct position in relation to an ideal model; and if the determined position of reflection of $n^{th}$ laser location is in the correct position, advancing to a next laser location (a next $n^{th}$ laser location, where n has been incremented to the next location in the array), and returning to the step of determining whether the position of reflection of said next $n^{th}$ laser location is in the correct position in relation to an ideal model.

In some embodiments, the present invention provides: a frame; a mirrored, electrically conductive film having a first face which is highly reflective and a second face facing the frame; means for stretching the mirrored, electrically conductive film across the frame in a manner which creates an enclosed chamber against the second face of the mirrored, electrically conductive film; means for pumping a fluid from the enclosed chamber facing the second face of the mirrored, electrically conductive film; means for applying an electrostatic force to one or more sub-areas of the second face of the mirrored film; means for acquiring an image of the first face of the mirrored, electrically conductive film; and means for calculating correction factors based on the acquired image; and means for sending control signals to control the pumping and to control the applying of electrostatic force to the one or more sub-areas of the second face of the mirrored film, in order to reshape the mirrored, electrically conductive film into an optically suitable shape.

Some embodiments further include means for projecting a first laser light pattern onto the first face of the mirrored, electrically conductive film, and wherein the acquiring of the image of the first face captures a reflection of the first laser light pattern, wherein the calculating of the correction factors is based on the captured reflection from the first face of the mirrored, electrically conductive film.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their object.

What is claimed is:

1. An adaptive flexible telescope mirror apparatus comprising:
    a frame;
    a mirrored, electrically conductive film having a first face which is highly reflective for collecting light from a subject of observation and a second face facing the frame, wherein the mirrored, electrically conductive film is stretched across the frame in a manner which creates an enclosed chamber against the second face of the mirrored, electrically conductive film;
    a pump operably coupled to the enclosed chamber facing the second face of the mirrored, electrically conductive film;
    an electrode array including a plurality of discrete electrode points and having an entire area, wherein the electrode array further includes a conductive material having a gradient of conductivity across the entire area;
    an electrostatic generator, wherein the electrostatic generator includes a first plurality of outputs each presenting a controllable voltage that has a first polarity, wherein each one of the first plurality of outputs is connected to a respective one of the plurality of discrete electrode points, and wherein the electrostatic generator includes a second-polarity output connected to the mirrored, electrically conductive film, wherein a measured voltage on a surface of the conductive material varies according to the controllable voltages applied to the respective ones of the discrete electrode points, and wherein the electrode array is located in the enclosed chamber facing the second face of the mirrored, electrically conductive film;
    a camera facing the first face of the mirrored, electrically conductive film;
    a computer-control system operably coupled to receive signals from the camera;
    a laser system configured to project a pattern of light toward the second face of the mirrored, electrically conductive film; and
    a photosensor array configured to receive light of the laser system reflected from the second face of the mirrored, electrically conductive film, wherein the photosensor array sends signals to the computer-control system, and wherein the computer-control system is configured to send control signals to the pump and to the overall electrode array, in order to reshape the mirrored, electrically conductive film into an optically suitable shape.

2. The apparatus of claim 1, further comprising a computer-readable medium having instructions stored thereon which, when executed by the computer-control system, perform a method comprising: performing calculations in the computer-control system based on input signals from the camera, and outputting signals from the computer-control system to the pump and to the electrode array, to shape the mirrored, electrically conductive film to an optically suitable shape.

3. The apparatus of claim 1, further comprising a laser system which projects a fixed laser-projection pattern of light onto the first face of the mirrored, electrically conductive film, the reflection of which is captured by the camera which faces the mirrored, electrically conductive film, wherein the camera sends signals to the computer-control system, wherein the computer-control system calculates correction factors and sends signals to the electrode array in a manner which creates an electrostatic force to one or more appropriate selected locations on the mirrored, electrically conductive film, in order to reshape the film to an optically suitable shape.

4. The apparatus of claim 1, further comprising: an electrically non-conductive dielectric liquid filling the enclosed chamber, wherein the pump applies force to the dielectric liquid.

5. The apparatus of claim 1, wherein a gas is used in the enclosed chamber against the second face of the mirrored, electrically conductive film, wherein the pump applies force to the gas.

6. A method comprising:
providing a frame;
providing a mirrored, electrically conductive film having a first face which is highly reflective and a second face facing the frame;
stretching the mirrored, electrically conductive film across the frame in a manner which creates an enclosed chamber against the second face of the mirrored, electrically conductive film;
locating an electrode array in the enclosed chamber facing the second face of the mirrored, electrically conductive film, wherein the electrode array includes a plurality of discrete electrode points and has an entire area, wherein the electrode array further includes a conductive material having a gradient of conductivity across the entire area, such that the electrode array faces the second face of the mirrored, electrically conductive film;
providing an electrostatic generator, wherein the electrostatic generator includes a first plurality of outputs each presenting a controllable voltage that has a first polarity, and wherein the electrostatic generator includes a second-polarity output;
connecting each one of the first plurality of outputs to a respective one of the plurality of discrete electrode points;
connecting the second-polarity output to the mirrored, electrically conductive film, wherein a measured voltage on a surface of the conductive material varies according to the controllable voltages applied to the respective ones of the discrete electrode points,
pumping a fluid from the enclosed chamber facing the second face of the mirrored, electrically conductive film;
applying an electrostatic force to one or more sub-areas of the second face of the mirrored, electrically conductive film using the overall electrode array and the electrostatic generator;
projecting a pattern of laser light toward the second face of the mirrored, electrically conductive film;
acquiring photosensor signals based on the projected pattern of laser light on the second face of the mirrored, electrically conductive film;
calculating correction factors based on the acquired photosensor signals; and
sending control signals to control the pumping and to control the applying of electrostatic force to the one or more sub-areas of the second face of the mirrored, electrically conductive film, in order to reshape the mirrored, electrically conductive film into an optically suitable shape.

7. The method of claim 6, further comprising projecting a fixed laser light pattern onto the first face of the mirrored, electrically conductive film, and wherein the acquiring of the image of the first face captures a reflection of the first laser light pattern, wherein the calculating of the correction factors is based on the captured reflection from the first face of the mirrored, electrically conductive film.

8. The method of claim 6, wherein the calculating correction factors based on the acquired image includes: determining the position of reflection of $n^{th}$ laser location; determining whether the position of reflection of $n^{th}$ laser location is in the correct position in relation to an ideal model; if the determined position of reflection of $n^{th}$ laser location is not in the correct position, adjusting the electrostatic force applied to $n^{th}$ laser location, and returning to the step of determining whether the position of reflection of $n^{th}$ laser location is in the correct position in relation to an ideal model; and if the determined position of reflection of $n^{th}$ laser location is in the correct position, advancing to a next $n^{th}$ laser location, and returning to the step of determining whether the position of reflection of said next $n^{th}$ laser location is in the correct position in relation to an ideal model.

9. An apparatus comprising:
a frame;
a mirrored, electrically conductive film having a first face which is highly reflective and a second face facing the frame, wherein the mirrored, electrically conductive film is stretched across the frame in a manner which creates an enclosed chamber against the second face of the mirrored, electrically conductive film;
means for pumping a fluid from the enclosed chamber facing the second face of the mirrored, electrically conductive film;
an electrode array, wherein the electrode array includes a plurality of discrete electrode points and has an entire area, and wherein the electrode array further includes a conductive material having a gradient of conductivity across the entire area;
an electrostatic generator, wherein the electrostatic generator includes a first plurality of outputs each presenting a controllable voltage that has a first polarity, wherein each one of the first plurality of outputs is connected to a respective one of the plurality of discrete electrode points, and wherein the electrostatic generator includes a second-polarity output connected to the mirrored, electrically conductive film, wherein a measured voltage on a surface of the conductive material varies according to the controllable voltages applied to the respective ones of the discrete electrode points, and wherein the electrode array is located in the enclosed chamber facing the second face of the mirrored, electrically conductive film;
means for projecting a pattern of laser light toward the second face of the mirrored, electrically conductive film;
means for acquiring photosensor signals based on the projected pattern of laser light on the second face of the mirrored, electrically conductive film;
means for calculating correction factors based on the acquired photosensor signals; and
means for sending control signals to control the pumping and to control the applying of electrostatic force to the one or more sub-areas of the second face of the mirrored, electrically conductive film, in order to reshape the film into an optically suitable shape.

10. The apparatus of claim 9, further comprising means for projecting a fixed laser light pattern onto the first face of the mirrored, electrically conductive film, and wherein the acquiring of the image of the first face captures a reflection of the laser light pattern, wherein the calculating of the correction factors is based on the captured reflection from the first face of the mirrored, electrically conductive film.

\* \* \* \* \*